United States Patent
Hodes et al.

(10) Patent No.: US 6,724,626 B1
(45) Date of Patent: Apr. 20, 2004

(54) APPARATUS FOR THERMAL MANAGEMENT IN A PORTABLE ELECTRONIC DEVICE

(75) Inventors: Marc Scott Hodes, New Providence, NJ (US); Alan Michael Lyons, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/426,462

(22) Filed: Apr. 30, 2003

(51) Int. Cl.[7] ................................................. H05K 7/20
(52) U.S. Cl. ........................ 361/700; 361/699; 257/714; 165/80.4; 165/104.21
(58) Field of Search ................................ 361/690, 699, 361/700; 257/706, 714, 715; 174/15.1, 15.2; 165/80.3, 80.4, 104.17

(56) References Cited

U.S. PATENT DOCUMENTS 5,661,637 A * 8/1997 Villaume .................... 361/687
6,230,788 B1 * 5/2001 Choo et al. ................. 165/46
6,367,544 B1 * 4/2002 Calaman .................... 165/135

FOREIGN PATENT DOCUMENTS

EP          571862 A1 * 12/1993 ............ H05K/7/20

* cited by examiner

Primary Examiner—Boris Chervinsky
(74) Attorney, Agent, or Firm—David W. Herring

(57) ABSTRACT

A heat-dissipating device is disclosed for use in an electronic device. This heat dissipating device includes a reservoir for holding a substance in a liquid state (e.g., water) and at least one heat transfer point for transferring heat from a heat source, such as a component in the electronic device, to the liquid substance. Heat causes the substance to transform into a gaseous state due to the transfer of thermal energy from the heat source to the substance. A gas permeable membrane is used to permit the substance to escape the reservoir when it is in a gaseous state while, at the same time, preventing the substance from escaping when it is in a liquid state.

16 Claims, 5 Drawing Sheets

APPARATUS FOR THERMAL MANAGEMENT IN A PORTABLE ELECTRONIC DEVICE

FIELD OF THE INVENTION

The present invention relates generally to portable electronic devices and, more particularly, to thermal management in such devices.

BACKGROUND OF THE INVENTION

Portable electronic devices, such as portable computers, cellular telephones, etc., are becoming more widespread as the convenience and utility of such devices become more apparent. Along with the increasingly widespread use of such devices, new capabilities and functionalities of those devices are being developed that require higher processing capacity. In order to make an electronic device more powerful (to possess greater processing capacity), additional transistors within components of those devices are usually necessary to accommodate more computational operations in a given amount of time. Alternatively, the frequency of calculations made by the transistors may be increased to produce greater computational operations. In portable electronic devices, the number of transistors may be increased by adding additional electronic components, or by increasing the number of transistors on an existing component. Adding components in such devices is usually not desired because doing so requires more circuit board space and, accordingly, a larger device. Therefore, increasing the processing power in such portable devices is typically accomplished by 1) adding transistors to existing components, 2) by increasing the computational frequency of existing transistors, or 3) by utilizing a combination of both approaches.

Heat dissipation is of paramount importance when designing increasingly powerful electronic devices. This is because increasing the frequency or increasing the number of transistors can lead to more heat generated by the electronic component. This concern is especially paramount in portable devices because, typically, the electronic components are contained within a relatively small, confined housing that makes adequate cooling difficult to achieve.

Various attempts have been made to address heat dissipation problems in portable electronic devices. For instance, in portable computers, various configurations of heat sinks, fans and other devices are traditionally used. In some applications, a heat sink is connected to a heat-generating component, such as a central processing unit (CPU) or a graphics processing unit (GPU) disposed on a circuit board within the computer. Heat sinks operate based on the principle that heat is dissipated at a lower temperature over a large surface area as compared to that dissipated over a relatively small surface area. The heat sink, therefore, has a physical geometry (e.g., heat conducting fins disposed on a heat conducting substrate), that creates a large total surface area. Thus, when heat is transferred from the CPU or GPU to the heat sink, heat is dissipated at a lower temperature due to the large fin surface area relative to the case where no heat sink is used.

Fans have also been used, either alone or in conjunction with a heat sink, to provide airflow over the heat-generating component/heat sink. Heat is transferred to the air as it flows over the component, thus cooling the component. However, as greater processing power has been introduced to components in portable electronic devices, such as the exemplary CPUs and GPUs in portable computers, fan-based and heat-sink based cooling solutions have proven undesirable in some instances, either because of insufficient cooling or because of increased noise due to an excessively high fan rotation speed needed to cool the heat-generating component. Therefore, more recently, other attempts have been made to cool these components.

In one such attempt, liquid cooling has been used to remove heat from heat-generating components. In these attempts, a reservoir of liquid (e.g., water) is used that is relatively cool compared to the heat-generating component. Hollow tubes are used with a small pump to transport the liquid to a heat spreader that is connected to the component. When the component is heated, this heat is transferred to the liquid within the heat spreader. The pump causes the water to circulate back to the reservoir where the heat is dissipated. As is obvious, the cooler the temperature of the liquid in the water reservoir, the more heat that can be dissipated. This cooling method has achieved significant reductions in the temperatures of heat-generating components in computers, especially in desktop-based systems. However, this method is less useful in portable electronic devices, such as portable computers because, while liquid cooling can achieve significant heat dissipation, such systems tend to greatly increase the size and weight of the computer if the reservoir is internal to the computer. Additionally, these active pumps may also add cost and decrease the reliability of the cooling system and, hence, the portable device itself. In the case of a portable computer, any such reservoir will be necessarily limited to a relatively small size and, therefore, will only be of limited effectiveness in cooling components within the computer. While an external reservoir could be used, portable computers generally are not manufactured with the necessary components to interface a heat-generating component with such an external reservoir. Since disassembling a portable computer can be technically challenging (compared for example to a desktop computer), such an interface would be difficult to achieve.

In another recent attempt to cool portable computers, phase-change devices have been used. Such devices take advantage of the fact that it takes a significant amount of thermal energy to change a substance from one physical state to another. These devices can utilize either a liquid-gas phase change or a solid-liquid phase change.

One example of a liquid-gas type of phase-change device is a device known as a "heat pipe." A heat pipe typically uses one or more hollow tubes (or pipes) to transport heat from one point to another (e.g., from a heat-generating component to a cooler location). Such devices usually are connected to a heat spreader device that is connected to the heat-generating component. The hollow tubes are used to transfer the heat from the heat spreader to a heat sink located at a cooler location (e.g., near a vent in a computer). The hollow tubes are typically filled with a fluid, such as distilled water. Typically, the liquid is at a very low pressure because the tube itself contains very little fluid in order to reduce the evaporation point of the liquid. In the portion of the heat pipe that is in contact with the heat spreader, the heat from the heat-generating component causes the water to evaporate. The vaporized water transports the heat through the hollow tube(s) to the aforementioned heat sink. Once in the heat sink, the evaporated water cools, condenses and returns to the heat spreader as a liquid via the hollow tubes. The same amount of heat is removed as in previous attempts however, because of the evaporation/condensation process, far less temperature difference between the heat generation component and the heat sink is required.

However, such heat pipe devices are limited in their usefulness. Specifically, such devices cannot transfer the amount of heat generated by many kinds of components, such as state of the art CPUs. Thus, this solution may be insufficient to cool components with an extremely large number of transistors or transistors that operate at a very high frequency. Additionally, the heat sink of such heat-pipe devices must usually be in a higher position than the heat spreader. With portable computers this may be problematic as the geometric form of such computers is such that it may not be possible to place the heat sink in this position.

Another example of a liquid-gas phase change device used with computers is a compressor- or refrigerator-based device. These devices work much the same as the heat pipe type system, discussed above. Similar to a heat pipe device, refrigerator-based systems remove heat from a heat-generating component with a heat spreader connected to hollow tubes. With refrigerator-based systems, however, the tubes are filled with a refrigerant substance that is cooled by a refrigerator to the point where it changes to a liquid state. The liquid refrigerant is then passed through the hollow tubes to the heat spreader that is in contact with the heat-generating electronic component. Since the refrigerant liquid is at a relatively low temperature, significant thermal energy is absorbed by the liquid in order to heat it to the temperature at which it evaporates and, subsequently vaporize the liquid, thus removing significant heat from the component via the heat spreader. The gaseous substance is then passed once again to a heat sink (condenser) where heat is removed from the refrigerant at which point it is converted back into a liquid.

Refrigerator-based systems are advantageous in that they can remove significant heat from a component. In fact, such components can be cooled below the ambient temperature using this method. However, such cooling is limited in its practical usefulness. Importantly, the extreme temperature difference between the refrigerant and the surrounding atmosphere can result in significant condensation forming on the external surfaces of the heat spreader and hollow tubes. Since these tubes are often disposed within an electronics enclosure (such as a computer case), such condensation is highly undesirable as it can damage the electronics components therein. Additionally, as in liquid-based systems, refrigerator-based heat-dissipation devices are often large and heavy and must interface with components within the computer. Also, electrical work must be supplied to the refrigerator device and dissipated as heat. Therefore, such systems are typically impractical for use with portable devices, such as portable computers.

In yet another previous attempt, a phase-change device based on changing the state of a substance from a solid to a liquid has been used to store heat and therefore, for example, to dramatically increase the time for the external housing of the computer to become hot. Such solid-liquid devices typically use a solid substance, such as wax, contained within a reservoir. The reservoir is disposed in a position such that heat is transferred from a heat-generating component to the reservoir and, hence, the wax. The heat/thermal energy is transferred to the wax, thereby causing the wax to melt. As discussed above, such a phase change requires a significant amount of energy and, therefore, such devices possess acceptable heat-dissipation properties for some uses. Additionally, such devices are usually small and reusable. However, wax only requires approximately one-tenth the energy per unit mass to change from a solid to a liquid as compared to water changing from a liquid to a gas (e.g., in the heat pipe example or the condenser-based example). Therefore, less heat (thermal energy) is removed from the heat-generating component using such a wax-based system. Additionally, once all the wax in the cartridge has been liquefied, the device becomes generally ineffective at removing heat. In this case, the wax cartridge must be cooled so that the wax can re-solidify before being able to be used to remove significant levels of heat. In many cases this can be impractical as significant time may be required for such cooling. In addition, several interchangeable, relatively heavy wax reservoirs may be required to maintain effective cooling.

SUMMARY OF THE INVENTION

The present inventors have realized that, while the above prior attempts are advantageous in some regards, each of these attempts is limited in at least one aspect of its usefulness in dissipating heat in electronics devices and, more particularly, portable electronic devices. In particular, none of the previously discussed attempts are 1) capable of dissipating sufficient heat from the device; and 2) lightweight/easily portable; and 3) easily rechargeable such that heat dissipation is not interrupted for an extended period of time.

The present inventors have developed a heat dissipation device for use in an electronic device. This heat dissipation device includes a reservoir for holding a substance in a liquid state and at least one heat transfer point for transferring heat from a heat source, such as a component in the electronic device, to the liquid. This heat causes the substance to transform into a gaseous state due to the transfer of thermal energy from the heat source to the substance. A gas permeable membrane may be used to permit the substance to escape the reservoir when it is in a gaseous state while, at the same time, preventing the substance from escaping when it is in a liquid state. In one embodiment, the aforementioned reservoir may be a cartridge filled with ordinary tap water that is inserted into a portable electronic device, such as a portable computer. When this reservoir is inserted into the device, it directly or indirectly contacts a heat-generating component within the device. Heat is thus transferred from the component to the water, thereby changing the state of the water from a liquid to a gaseous state. This gas is then allowed to escape the reservoir via a gas permeable membrane thereby dissipating the thermal energy of the gas to the atmosphere.

DETAILED DESCRIPTION

Figure 1:
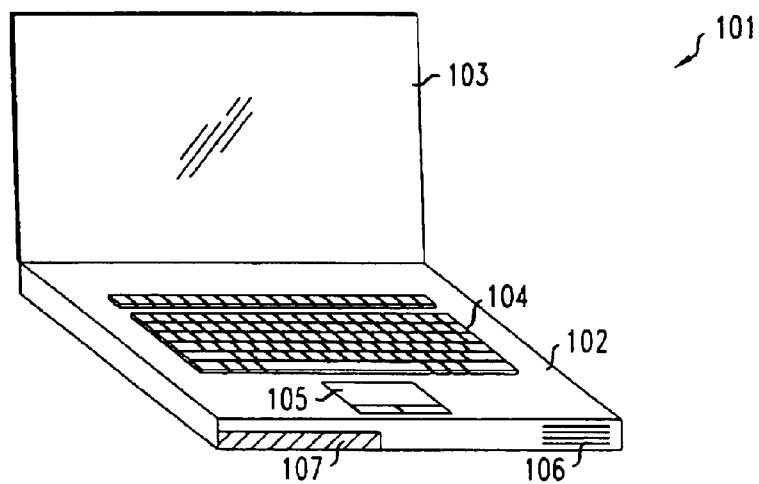
FIG. 1 shows a prior art portable computer.

FIG. 1 shows an illustrative prior art portable computer 101 having base portion 102 and display portion 103. Keyboard 104 is used to input data into portable computer 101 and, along with pointing device 105, is used to control the various functions of the computer 101. Vent 106 is, illustratively, a cooling vent. A fan may, for example, be placed behind vent 106 in order to force hot air generated by electronic components within base 102 out of computer 101 or, alternatively, to draw cool air into computer 101 to cool those components.

Figure 2:
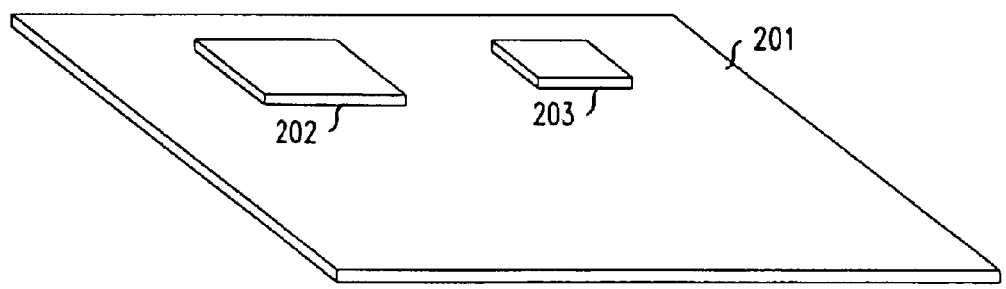
FIG. 2 shows a circuit board of the computer of FIG. 1.

FIG. 2 shows an illustrative circuit board 201 such as a motherboard used in the portable computer of FIG. 1. Central processing unit (CPU) 202 and graphics processing unit 203 are, for example, disposed on circuit board 201. One skilled in the art will recognize that this is a greatly simplified illustration of a circuit board as used in a typical portable computer and that such a circuit board will have many other electronic components disposed thereon. CPU 202 and GPU 203, which may be disposed in various locations on circuit board 201, are typically the electronic components that generate the greatest amount of heat on such a circuit board. Since an excessive temperature can degrade the performance of a computer or make its case uncomfortable or even dangerously hot, such as computer 101 of FIG. 1, and can at extreme levels damage the electronic components within such a computer, it is desirable to dissipate at least a substantial portion of the heat generated.

Figure 3:
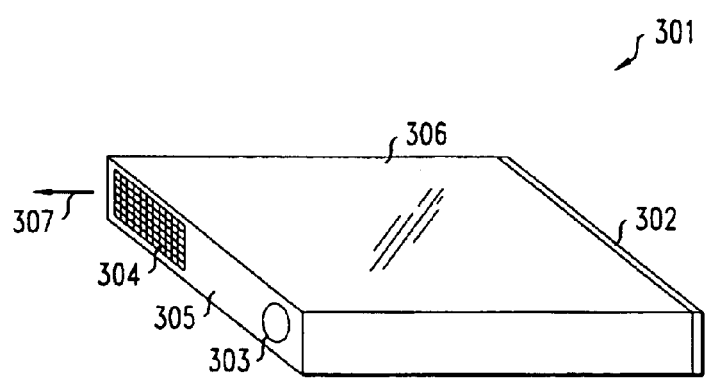
FIG. 3 shows a heat dissipation device in accordance with the principles of the present invention.

FIG. 3 shows one embodiment of a heat dissipation device 301 in accordance with the principles of the present invention useful in dissipating heat from a portable electronic device such as, for example, the portable computer 101 of FIG. 1. In FIG. 3, device 301 has enclosed reservoir 306, which is a reservoir suitable for holding a substance, illustratively liquid tap water. The material used to manufacture reservoir 306 may be, for example, aluminum or any material that is suitable for containing the substance in both a cooled state and a heated state. In this illustrative example, water (e.g., from a water faucet) enters reservoir 306 via valve 303 on surface 305. In order to prevent the water from freely moving within the reservoir 306, various absorbent materials may be disposed within this reservoir. A material suitable for use for this purpose is, illustratively, a well-known zeolite material. Zeolites act as molecular level sieves that only allow limited motion of a liquid substance by, for example, constricting the flow of that substance, through the channels in the material. Other absorbent materials may also be used to constrain the movement of the liquid substance inside reservoir 306. Such materials include well-known silica gels, as well as super-absorbant polymers, such as those commonly used in disposable diapers. Other methods of constricting the flow of liquid within a reservoir are well known and will be apparent to one skilled in the art.

Valve 303 is, for example, a one-way valve that, when not used to fill the reservoir, prevents the water from exiting the reservoir 306 through the valve 303. Illustrative plate 302 is a plate made from a thermal conducting material such as, for example, copper. Plate 302 acts as a heat transfer point that is used to transfer heat from an external source to the substance within reservoir 306. One skilled in the art will realize that a plate such as plate 306 may or may not be used with reservoir 306, or that plate 302 could be integrated with reservoir 306. One skilled in the art will also realize that many suitable materials may be used to form such a plate 302 if one is used.

Window 304 is, for example, a window covered with one or more layers of a gas permeable fabric to form a gas-permeable membrane such that gaseous substances, such as water vapor, may freely pass through the fabric into and out of the reservoir. The gas permeable fabric for this membrane must be selected, however, such that when the chosen substance is in liquid form, such as in the this illustrative example when the substance is liquid water, it will not pass through the fabric. A fabric suitable for use in this illustrative embodiment is Gore-Tex® fabric. Gore-Tex® fabric is a well-known fabric characterized in part by pores that are large enough to permit water vapor molecules to pass through the fabric, yet are small enough to prevent the larger liquid water molecules from passing through the fabric. One skilled in the art will recognize that many fabrics may be suitable for use for window 304 depending upon the substance used within reservoir 306.

Figure 4:
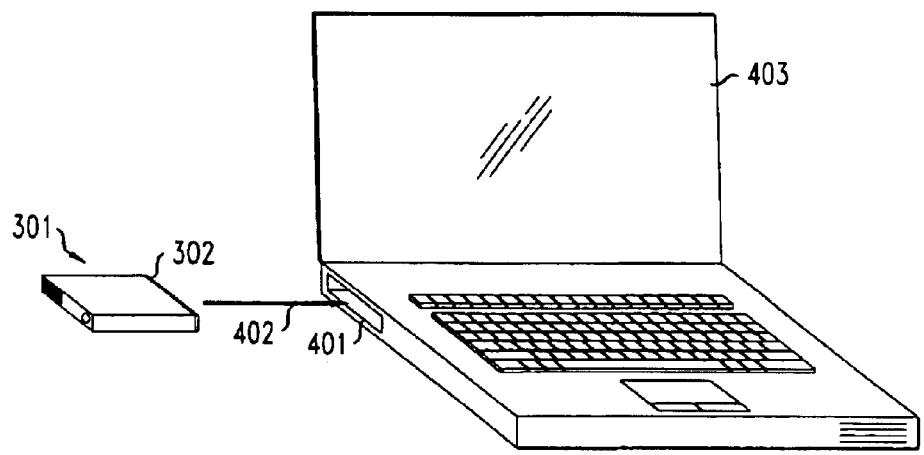
FIG. 4 shows an illustrative embodiment of how the heat dissipation device of FIG. 3 could be inserted into a portable computer.
Figure 5:
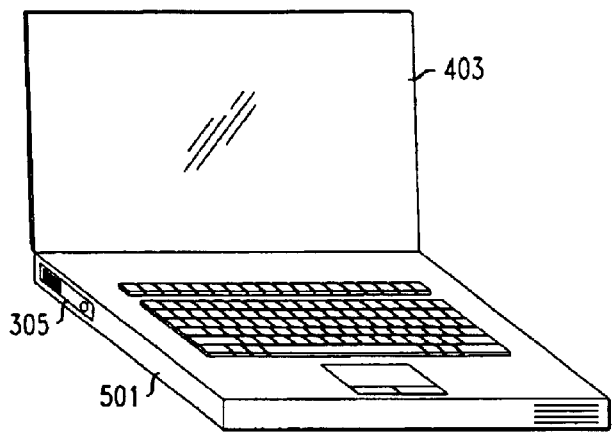
FIG. 5 shows an illustrative embodiment of the heat dissipation device of FIG. 3 in its operational position fully inserted into a portable computer.

FIG. 4 illustrates how the heat dissipation device 301 of FIG. 3 may be used with a portable computer 403 that is, for example, similar to portable computer 101 of FIG. 1. Specifically, device 301 is inserted in slot 401 in direction 402 in a way such that plate 302 can be brought into contact with a heat-generating device, such as CPU 202 in FIG. 2. FIG. 5 shows how, once inserted, surface 305 of device 301 of FIG. 4 is, illustratively, flush with surface 501 of portable computer 403.

Figure 6:
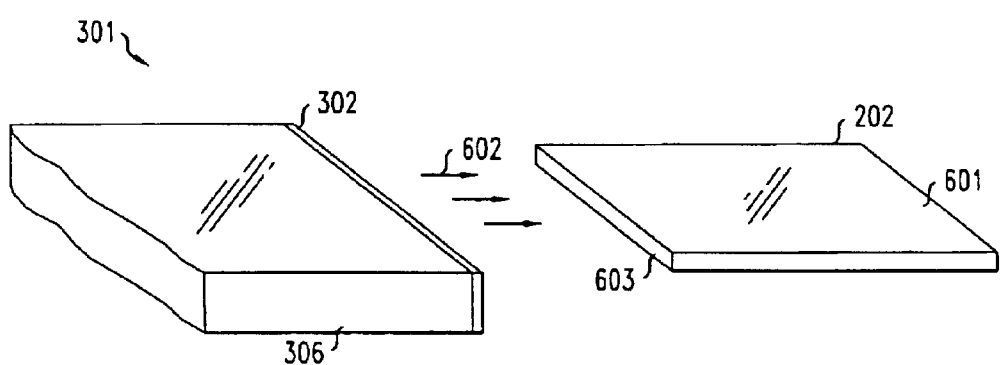
FIG. 6 shows one illustrative embodiment of how the heat dissipation device of FIG. 3 could be brought into direct contact with a heat-generating component within an electronic device.

FIG. 6 shows a first illustrative embodiment of how, once inserted into portable computer 403 of FIG. 4, device 301 having reservoir 306 is brought into contact with a heat generating device, illustratively CPU 202, in order to dissipate heat from that device. Specifically, as previously discussed, device 301, filled with a substance such as for example tap water, is inserted into portable computer 403 of FIG. 4 in a way such that heat transfer plate 302 is brought into contact with the heat generating device. As device 301 is inserted into the computer, plate 302 on device 301 moves in direction 602 until plate 302 contacts side 603 of CPU 202. As a result of this contact, when CPU 202 generates heat during operation, that heat is transferred through plate 302 to the water in reservoir 306. As the rate of heat generated by the CPU 202 rises, the rate of water changing phase from a liquid state to a gaseous/vaporous state increases. This phase change is beneficial in that significant energy (i.e., approximately $2.2 \times 10^6$ J/kg) is required to accomplish such a phase change in water. Once this phase change has occurred, the ambient pressure within the reservoir rises, thereby causing the vapor to tend to move toward any opening within the reservoir. Referring once again to FIG. 3, the only opening available is window 304 which is, illustratively, covered with Gore-Tex® gas-permeable fabric. Accordingly, since the water vapor freely moves through. the pores in the fabric of window 304, that vapor will exit reservoir 306 in direction 307. In this way, heat is transferred from CPU 202 in FIG. 6 to the water in reservoir 306 in that figure. That water is changed in phase into a gaseous/vaporous state and exits reservoir 306 in direction 307, as shown in FIG. 3. Devices such as device 301 in FIG. 6 can for example, dissipate up to 50 Watts of power for up to 72 minutes. This method of heat dissipation has the benefit that no energy is required to change the water back into a liquid state for recirculation, as is necessary in closed-loop cooling systems (e.g., which typically require a condenser or a fan to remove heat from the heated water). Additionally, referring once again to FIG. 6, surface 601 of CPU 202 remains available for use with a traditional heatsink or other cooling device, if desired.

One skilled in the art will recognize that, as the water vapor exits the reservoir 306 of FIG. 6, the water level within the reservoir will drop until the reservoir 306 is empty. At this point, heat dissipation device 301 will not be capable of providing significant heat dissipation. An audible or visible warning signal may be illustratively generated when the water level within the reservoir drops below a certain point. At that point, for example, it may be desirable to refill the reservoir 306, via for example valve 303 in FIG. 3, in order to continue using device 301 to dissipate heat. Ordinary tap water, as used in the illustrative embodiment herein, has the benefit of being widely available (such as, for example, in an airplane lavatory). Thus, refilling reservoir 306 via valve 303 is usually convenient when tap water is used within device 301. One skilled in the art will be able to devise numerous embodiments of adapters for use with illustrative valve 303 such that water from a tap can be transferred into reservoir 306 with no spillage or leakage of that water. If such a water tap is not conveniently available to refill the reservoir, the processor speed, illustratively, of a portable electronic device may be decreased to reduce the heat generated by the components within the device. When the reservoir is refilled, the processor can then revert to a higher speed.

Figure 7:
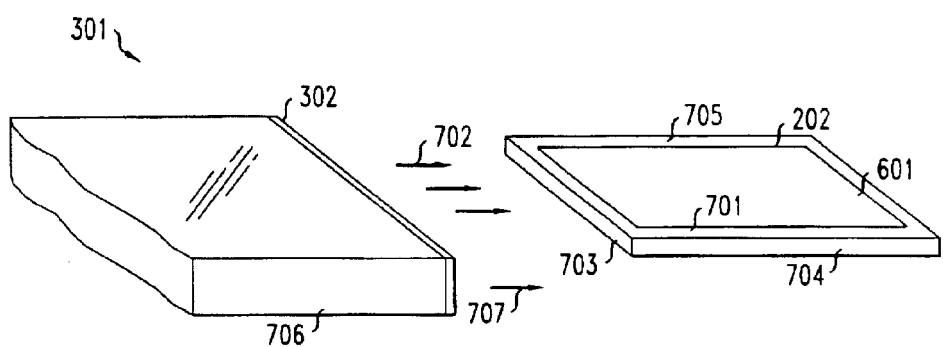
FIG. 7 shows an illustrative embodiment of how the heat dissipation device of FIG. 3 could be brought into contact with a heat-generating component within an electronic device via a heat spreader.

One skilled in the art will also recognize that the greater the area of contact between heat dissipating device 301 and, for example, CPU 202, the smaller the temperature difference required to transfer heat from CPU 202 to device 301 and as a result, the lower the operating temperature of the CPU, thus leading to higher performance and reliability. FIG. 7 shows another illustrative embodiment of the use of heat dissipating device 301. In this embodiment, a heat spreader 701 is disposed around the perimeter of CPU 202 in a way such that it contacts each of the edges of CPU 202. Heat spreader 701 may, for example, be fashioned as a solid metal thermal conducting spreader or, alternatively, may be a hollow tube containing a liquid or gaseous fluid efficient at transferring heat from the CPU 202 to heat transfer plate 302.

Heat transfer plate 302 on device 301 is moved in direction 702, as described above, until heat transfer plate 302 contacts at least one side of heat spreader 701, such as side 702. One skilled in the art will recognize that it may be desirable to use various configurations of device 301 such that a greater surface contact area results between heat spreader 701 and heat dissipating device 301. For example, edge 706 of device 301 may be extended in direction 707 such that, when inserted into, for example, the illustrative portable computer 403 of FIG. 4, the extended edge is brought into contact with side 704 of heat spreader device 701. As in FIG. 6, the heat dissipation device illustrated in FIG. 7 has the benefit of being able to be used with a more traditional cooling apparatus if desired, such as a heat sink attached to surface 601 of CPU 202.

Figure 8:
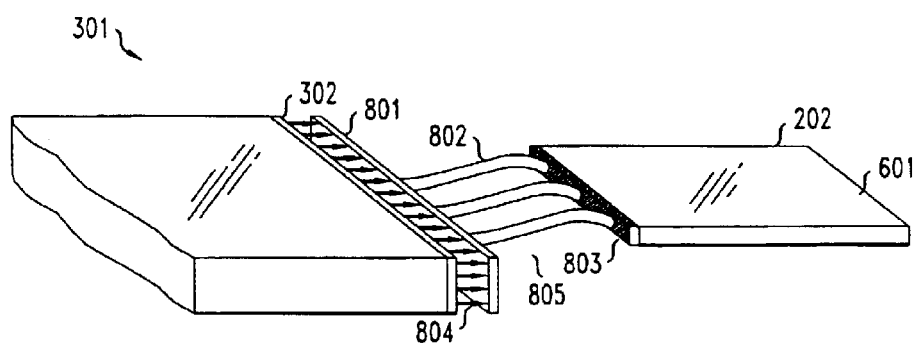
FIG. 8 shows an illustrative embodiment of how the heat dissipation device of FIG. 3 could be brought into contact with a heat-generating component within an electronic device via a heat pipe.

Other various configurations suitable for similarly increasing this contact area will be readily apparent to one skilled in the art in light of the disclosure herein. For example, FIG. 8 shows another embodiment of how device 301 may be used with an increased area of contact. In this embodiment, heat transfer plate 302 on device 301 is inserted in direction 804 into illustrative computer 403 of FIG. 4, similar to the embodiment shown in FIG. 6. However, instead of directly contacting CPU 202, heat transfer plate 302 contacts plate 801 that is a plate in a heat pipe device 805. This heat pipe device serves the function of transferring heat from an edge of CPU 202, with a relatively small surface area, via heat pipes 802, to plate 801 having a significantly larger surface area. Similar heat pipe devices are very well known in the art and are known to be efficient methods of transferring heat from one area to another larger area where heat may be dissipated. As will be apparent to one skilled in the art, in addition to coupling heat pipes 802 to plate 803, the heat pipes 802 of heat pipe device 805 may be coupled to a heat spreader such as heat spreader 701 in FIG. 7 in order to increase the area of contact between the CPU 202 and the heat pipe device 805 even further. Additionally, it will also be apparent to one skilled in the art that surface 601 of CPU 202 remains available for use with a heat sink or other device, much as is the case with the embodiments of FIGS. 6 and 7.

Figure 9:
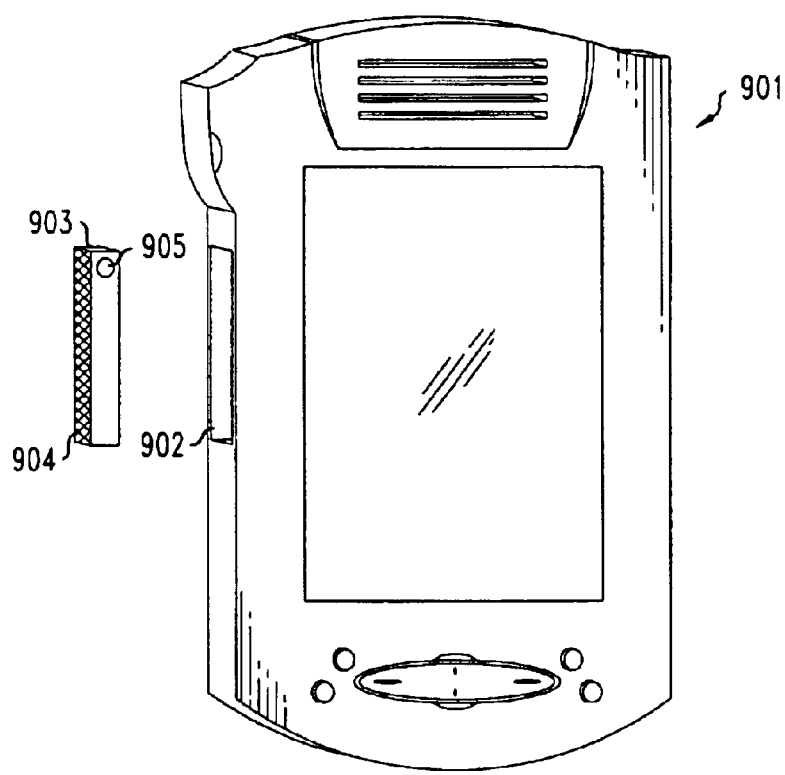
FIG. 9 shows an illustrative embodiment wherein a heat dissipation device in accordance with the principles of the present invention is used in a personal digital assistant.

Lastly, FIG. 9 shows a final embodiment of a heat dissipation device 903 that may be used with a smaller portable electronic device, illustratively shown here as personal digital assistant (PDA) 901. Other small portable electronic devices, such as mobile telephones, may also benefit from the use of a heat dissipation device similar to dissipation device 903. Portable electronic devices, such as PDA 901 are typically much smaller than a portable/laptop computer, such as portable computer 403 in FIG. 4 and do not produce as much heat as do such computers. Therefore, smaller heat dissipation devices, such as device 903 may be used to obtain satisfactory cooling over a significant period of time.

As shown in FIG. 9, opening 902 in PDA 901 is adapted such that heat dissipation device 903 having gas permeable membrane 904 may be inserted in direction 906 into opening 902. Before being inserted, water, for example, is placed within device 903 via valve 905, which is similar to valve 303 in FIG. 3. Once inserted, similar to the embodiments as described above, at least a portion of device 903 is brought into contact with a heat-generating component, such as a CPU or GPU within PDA 901. According to principles similar to those disclosed previously, when the heat is transferred to the water, the water changes into a gaseous/vaporous state. As before, this water vapor exits device 903 and heat is dissipated from the respective component with PDA 901.

The foregoing merely illustrates the principles of the invention. It will thus be appreciated that those skilled in the art will be able to devise various arrangements which, although not explicitly described or shown herein, embody the principles of the invention and are within its spirit and scope. For example, a fan may be used in combination with the aforementioned heat-dissipation devices in order to reduce the concentration of water vapor in the space above the liquid in the reservoir of those devices. This reduction in concentration would lower the pressure within the reservoir and, accordingly, enable more efficient cooling. Additionally, one skilled in the art, in light of the descriptions of the various embodiments herein, will recognize that it may be useful to use a thermal transfer material (such as a thermal paste) to coat the surface of the heat-generating component at the point or area where a surface of the water reservoir contacts that component. One skilled in the art will also recognize that, while the reservoirs disclosed hereinabove, such as reservoir 306 in FIG. 3, are removable from the portable electronic device, such a reservoir could be integrated within the device itself. In disposable electronic devices, for example, that may utilize such integrated reservoirs, the water or other cooling substance may be brought into direct contact with a heat-generating component. This eliminates the above-described thermal interface (e.g., plate 302 in FIG. 3) between the component and the reservoir and, as a result, may be more efficient at cooling.

Finally, one skilled in the art will recognize that, while the embodiments disposed herein show portable electronic devices, the principles disposed herein could also be used with relatively stationary electronic devices (such as "desktop" personal computers). When used with such a stationary device, one skilled in the art will further recognize that the gas permeable membrane described herein may not be necessary. This is because, since the device (and hence the reservoir) are stationary, the problem of water moving about within the reservoir, and possibly spilling, is avoided. Rather. instead of using a gas permeable membrane, the reservoir may have one or more openings, that will allow a substance in a gaseous state to escape the reservoir.

All other examples and conditional language recited herein are similarly intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. Apparatus for dissipating heat in an electronic device, said apparatus comprising:

a reservoir for holding a substance in a liquid state;

at least one heat transfer point for transferring heal from a heat source to said substance, thereby causing said substance to transform into a gaseous state, and a gas-permeable membrane for allowing said substance in a gaseous state to escape from said reservoir, thereby dissipating at least a portion of said heat.

2. The apparatus of claim 1 wherein said gas-permeable membrane is impermeable to said substance in a liquid state.

3. The apparatus of claim 1 wherein said gas-permeable membrane forms at least a portion of the surface of said reservoir.

4. The apparatus of claim 1 wherein said heat source is a heat-generating component within a portable electronic device.

5. The apparatus of claim 4 wherein said portable electronic device is a portable computer.

6. The apparatus of claim 1 further comprising an absorbent material disposed in said reservoir in a way such that a flow of liquid in said reservoir is constrained.

7. Apparatus for use in an electronic device comprising:

means for contacting at least one heat transfer point of a reservoir with a heat source, said reservoir containing at least a first substance in a liquid state;

means for transferring heat from said heat source to the at least a first substance in said reservoir, wherein, in response to said heat transfer, said substance changes state from said liquid state to a gaseous state, and at least a first gas-permeable membrane for allowing said substance in a gaseous state to escape said reservoir.

8. The apparatus of claim 7 wherein said gas-permeable membrane is impermeable to said substance in a liquid state.

9. The apparatus of claim 7 wherein said gas-permeable membrane forms at least a portion of the surface of said reservoir.

10. The apparatus of claim 7 wherein said heat source is a heat-generating component within a portable electronic device.

11. The apparatus of claim 10 wherein said portable electronic device is a portable computer.

12. The apparatus of claim 10 wherein said portable electronic device is a mobile phone.

13. The apparatus of claim 7 wherein said means for allowing said substance in a gaseous state to escape comprises at least a first opening in said reservoir.

14. The apparatus of claim 7 further comprising an absorbent material disposed in said reservoir in a way such that a flow of liquid in said reservoir is constrained.

15. The apparatus of claim 7 further comprising means for reducing the concentration of water vapor in the space above the liquid in said reservoir.

16. The apparatus of claim 15 wherein said means for reducing comprises a fan disposed in a way such that said water vapor is dissipated faster than it otherwise would be.

* * * * *